United States Patent
Cahill et al.

(10) Patent No.: US 10,176,070 B2
(45) Date of Patent: Jan. 8, 2019

(54) SYSTEM AND METHOD FOR DIAGNOSING LINE REPLACEABLE UNIT FAILURE INCLUDING MEASURING A HYDRAULIC PRESSURE AND DERIVING A MARGINAL DISTRIBUTION FOR EACH LRU

(71) Applicant: GOODRICH CORPORATION, Charlotte, NC (US)

(72) Inventors: Eric D. Cahill, Troy, OH (US); Paul R. Burte, Clayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 62 days.

(21) Appl. No.: 14/716,556

(22) Filed: May 19, 2015

(65) Prior Publication Data
US 2016/0342496 A1    Nov. 24, 2016

(51) Int. Cl.
G06F 11/30 (2006.01)
G05B 23/02 (2006.01)
G06F 11/34 (2006.01)

(52) U.S. Cl.
CPC ........ G06F 11/3013 (2013.01); G05B 23/024 (2013.01); G06F 11/3452 (2013.01); G05B 23/0259 (2013.01)

(58) Field of Classification Search
CPC ............... G06F 11/008; G06F 11/2257; G06F 11/3013; G06F 11/3452; G05B 23/0259; G05B 23/0275; G05B 23/024
See application file for complete search history.

(56) References Cited

U.S. PATENT DOCUMENTS

| | | | |
|---|---|---|---|
| 4,839,823 A * | 6/1989 | Matsumoto ......... | G05B 23/024 702/181 |
| 4,943,919 A | 7/1990 | Aslin et al. | |
| 5,123,017 A | 6/1992 | Simpkins et al. | |
| 5,161,158 A * | 11/1992 | Chakravarty ......... | G06F 11/261 714/26 |
| 5,317,514 A * | 5/1994 | Bancroft ................ | G01S 19/20 342/357.44 |
| 6,587,960 B1 * | 7/2003 | Barford ............... | G06F 11/2257 714/6.13 |
| 6,868,319 B2 | 3/2005 | Kipersztok et al. | |
| 7,509,537 B1 * | 3/2009 | Jensen ............... | G05B 23/0229 714/47.2 |
| 8,001,423 B2 | 8/2011 | Spier et al. | |
| 8,463,641 B2 | 6/2013 | Reddy | |
| 8,510,083 B2 | 8/2013 | Kipersztok et al. | |
| 8,862,364 B2 | 10/2014 | Kim | |
| 2004/0078171 A1 | 4/2004 | Wegerich et al. | |

(Continued)

OTHER PUBLICATIONS

Wikipedia's Lookup Table historical version from Mar. 31, 2015 https://en.wikipedia.org/w/index.php?title=Lookup_table&oldid=654295861.*

(Continued)

*Primary Examiner* — Joseph O Schell
(74) *Attorney, Agent, or Firm* — Snell & Wilmer L.L.P.

(57) ABSTRACT

A system and method of identifying part failures is provided. The system may comprise monitoring a sensor, detecting a failure mode, selecting a row from a lookup table corresponding to the failure mode, looking up a line replaceable unit (LRU) failure probability for the detected failure mode, and reporting the LRU failure probability for the detected failure mode.

3 Claims, 3 Drawing Sheets

(56) References Cited

U.S. PATENT DOCUMENTS

| | | | | |
|---|---|---|---|---|
| 2005/0283694 | A1* | 12/2005 | Shabib | G01R 31/3187 |
| | | | | 714/733 |
| 2008/0147740 | A1* | 6/2008 | Bailly | G06Q 10/06 |
| 2008/0154458 | A1* | 6/2008 | Brandstetter | G06Q 10/087 |
| | | | | 701/29.3 |
| 2010/0100259 | A1* | 4/2010 | Geiter | G06N 5/045 |
| | | | | 701/3 |
| 2011/0010130 | A1* | 1/2011 | Hadden | G05B 23/0248 |
| | | | | 702/181 |
| 2014/0222355 | A1* | 8/2014 | Cheim | G05B 23/024 |
| | | | | 702/58 |
| 2014/0310222 | A1* | 10/2014 | Davlos | G06N 5/04 |
| | | | | 706/46 |

OTHER PUBLICATIONS

Brake Pins by Mayday.call published by PPRuNe Forums, Nov. 9, 2010 https://www.pprune.org/archive/index.php/t-433229.html (Year: 2010).*

Crane Aerospace and Electronics' RFID-Based Tire Pressure Sensor by Claire Swedberg published by RFID Journal, 2013 http://www.rfidjournal.com/articles/view?10954 (Year: 2013).*

Absolutely Everything You Ever Wanted to Know About Airplane Controls published by Gizmodo, Jan. 7, 2015 https://gizmodo.com/absolutely-everything-you-ever-wanted-to-know-about-air-1677766628 (Year: 2015).*

Extended European Search Report dated Aug. 25, 2016 in European Application No. 16170226.1.

European Patent Office, European Office Action dated Feb. 6, 2018 in Application No. 16 170 266.1-1204.

* cited by examiner

SYSTEM AND METHOD FOR DIAGNOSING LINE REPLACEABLE UNIT FAILURE INCLUDING MEASURING A HYDRAULIC PRESSURE AND DERIVING A MARGINAL DISTRIBUTION FOR EACH LRU

FIELD

The present disclosure relates to aircraft systems, and, more specifically, to braking and brake control systems.

BACKGROUND

In many industries, machines rely on parts that occasionally fail or wear. For example, there are numerous systems in an aircraft that may require occasional replacement. Downtime and replacement may be costly when incurred by a commercial airline. Expedient and accurate repair crews can ensure favorable uptime and repair costs.

Repair crews may be faced with ambiguous symptoms that could be a sign of wear or failure at multiple locations on an aircraft. A ground crew making inaccurate diagnosis of the cause for the symptoms may replace unnecessary parts before fixing the actual problem. In some instances, the ground crews may have an idea which components may be faulty but have no way to tell which component has actually failed.

SUMMARY

According to various embodiments, a method of identifying part failures in an aircraft may comprise monitoring a sensor, detecting a failure mode, selecting a row from a lookup table corresponding to the failure mode, looking up a line replaceable unit (LRU) failure probability for the detected failure mode, and reporting the LRU failure probability for the detected failure mode.

In various embodiments, the method further comprises normalizing, by the controller, the LRU failure probability. Reliability, maintenance, and safety (RMS) data may be compiled and normalized for the lookup table. LRU failures may be ranked by the controller based on the LRU failure probability. Domain expertise data may be compiled and normalized for the lookup table. A marginal distribution may be derived for each LRU failure. The controller may monitor a measuring point. The lookup table may comprise one row for each possible failure mode and one column for each LRU.

According to various embodiments, a system for identifying failure probabilities may comprise a sensor in electronic communication with a controller, and a tangible, non-transitory memory configured to communicate with the controller, the tangible, non-transitory memory having instructions stored thereon that, in response to execution by the controller, cause the controller to perform operations. The operations may comprise detecting a failure mode, selecting a row from a lookup table corresponding to the failure mode, looking up a LRU failure probability for the detected failure mode, and reporting the LRU failure probability for the detected failure mode.

In various embodiments, the controller may normalize the LRU failure probability. The controller may also rank LRU failures based on probability. The operations may include deriving a marginal distribution for each LRU failure. The lookup table may comprise one row for each possible failure mode from a plurality of failure modes. The lookup table may also comprise one column for each LRU from a plurality of LRUs.

According to various embodiments, a non-transitory medium may have instructions stored thereon that, in response to execution by a controller, cause the controller to perform operations. The operations may comprise monitoring the sensor, detecting a failure mode based on a sensor output, selecting a row from a lookup table corresponding to the failure mode, looking up a line replaceable unit failure probability for the detected failure mode, and reporting the LRU failure probability for the detected failure mode.

In various embodiments, the operations may further comprise ranking LRU failures based on probability, and deriving a marginal distribution for each LRU failure. The lookup table may comprise at least one of a row or a column for each possible failure mode from a plurality of failure modes. The lookup table may also comprise at least one of a column or a row for each LRU from a plurality of LRUs.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
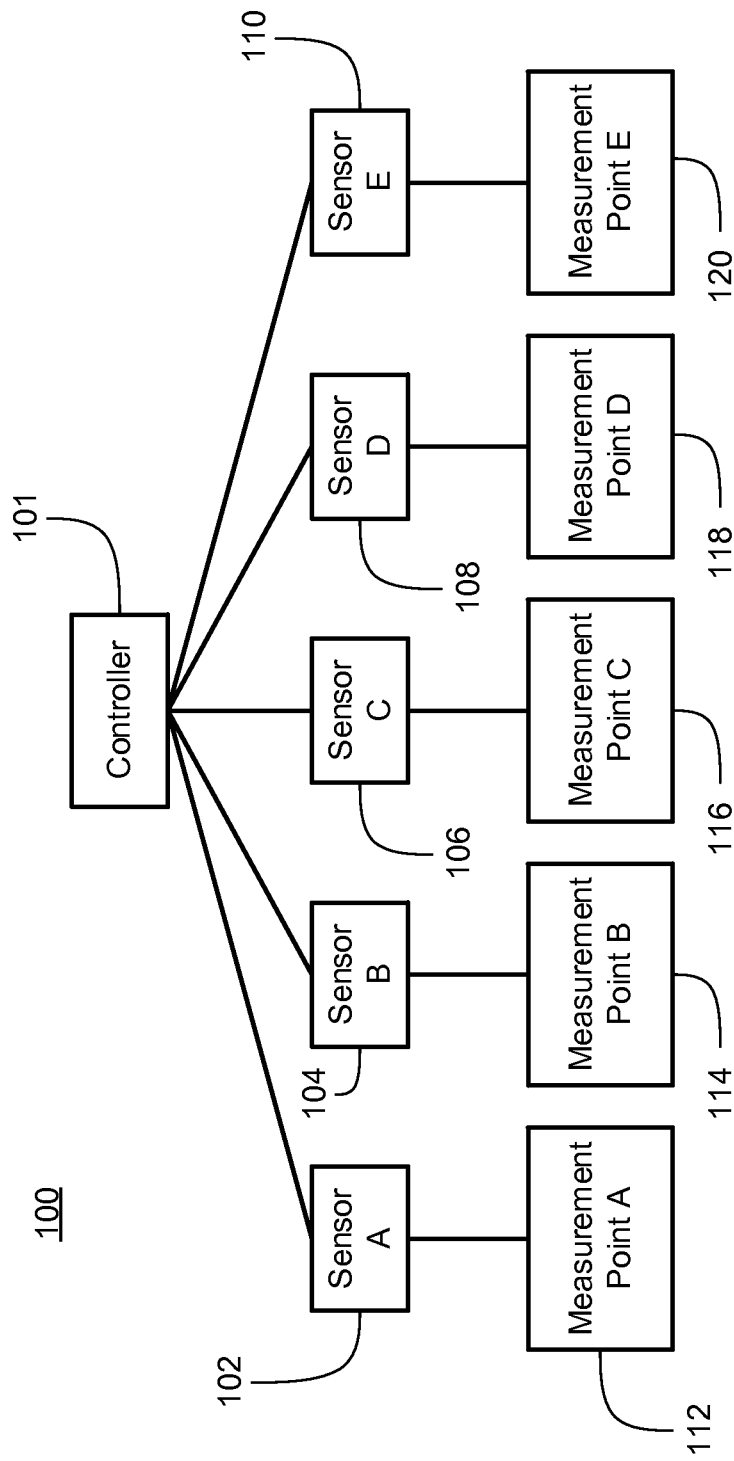
FIG. 1 illustrates an exemplary system for detecting line replaceable unit (LRU) failure or wear, in accordance with various embodiments.

With reference to FIG. 1, a system 100 for identifying a line replaceable unit (LRU) failure or malfunction is shown, in accordance with various embodiments. An LRU may be any component in a vehicle that can be replaced. For example, a LRU in a brake system may include a brake control unit, wheel speed sensors, shut off valves, servo valves, pressure sensors, pedal sensors, emergency park brake valves, emergency park brake handle, auto brake switches, auto brake light indicators, communication buses, hydraulic fuses, shuttle valves, brakes, etc.

In various embodiments, system 100 may comprise a controller 101. Controller 101 may be a computer system onboard an aircraft such as a brake control unit (BCU), a full authority digital engine control (FADEC), and/or an engine-indicating and crew-alerting system (EICAS), for example. Controller 101 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, controller 101 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101. In various embodiments, the processor may be configured to determine the likelihood of LRU failures in response to a detected failure mode.

In various embodiments, controller 101 may be electrically coupled to sensor 102 (sensor A), sensor 104 (sensor B), sensor 106 (sensor C), sensor 108 (sensor D), sensor 110 (sensor E), and any number of additional sensors. Sensor A may monitor measurement point 112 (measurement point A) to determine operating conditions at measurement point A. Sensor B may monitor measurement point 114 (measurement point B) to determine operating conditions at measurement point B. Sensor C may monitor measurement point 116 (measurement point C) to determine operating conditions at measurement point C. Sensor D may monitor measurement point 118 (measurement point D) to determine operating conditions at measurement point D. Sensor E may monitor measurement point 120 (measurement point E) to determine operating conditions at measurement point E.

In various embodiments, the sensors coupled to controller 101 may each be capable of detecting improper operation. For example, sensor A may be a pressure sensor monitoring pressure at a discrete location of a hydraulic braking system. Sensor A may detect that the hydraulic pressure at measurement point A is 20% below the expected operating pressure. The sensors may monitor conditions throughout the aircraft, such as engine revolutions per minute, temperatures, fuel flow, fuel levels, oil pressure, hydraulic systems, pneumatic systems, electrical systems, deicing systems, environmental and control surface systems, and any other suitable system containing one or more LRU. Controller 101 may thus detect failure modes by comparing measured conditions at measuring points to expected conditions at the same measuring points.

Figure 2:
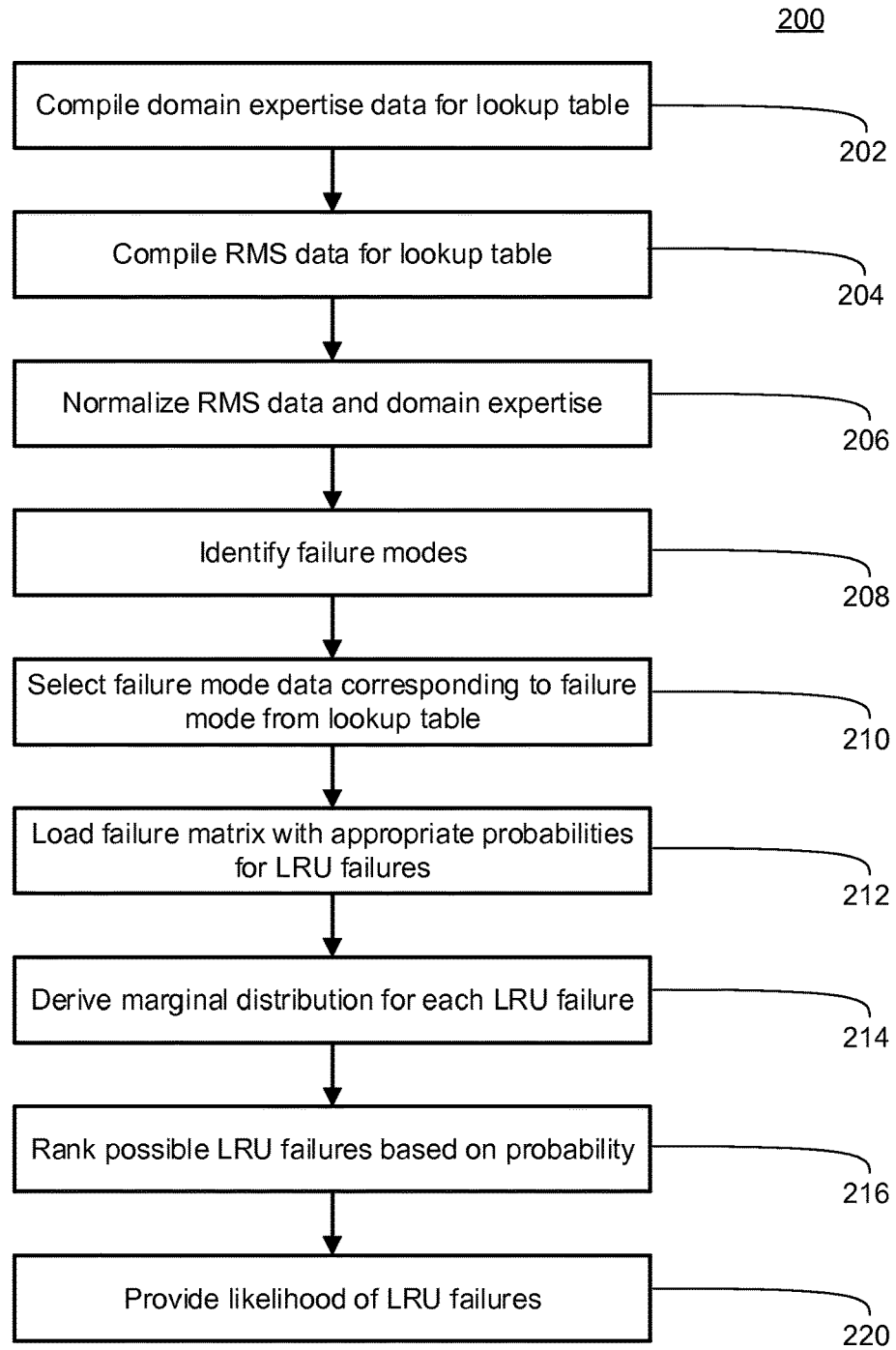
FIG. 2 illustrates a process for diagnosing LRU failure or wear based on a detected failure mode, in accordance with various embodiments.

With reference to FIG. 2, a process 200 to populate a lookup table (e.g., table T1 below, also referred to as a failure matrix) and predict LRU failure probability using system 100 (of FIG. 1) is shown, in accordance with various embodiments. Process 200 may begin by compiling domain expertise data for a lookup table (Step 202). Expertise data may include subjective opinions of experts on the applicable LRU and failure modes. Reliability, safety, and management (RMS) data may also be compiled for the lookup table (Step 204). The RMS data and domain expertise may then be normalized (Step 206).

In various embodiments, RMS data may come from RMS supporting analyses (i.e., FHA (Fault Hazzard Management), FMEA (Failure Modes and Effects Analysis), fault trees, and/or PSSA/SSA (Preliminary/System Safety Analysis) data). FHA, FMEA, and PSSA/SSA may be based on regulatory requirements and/or industry standards. While the foregoing data sources are explicitly listed, any suitable LRU failure probability data may be used to populate a lookup table. The RMS data may be entered or resolved into each cell in the lookup table. Typically the probability information may be derived from the PSSA/SSA fault trees. Fault tree 'cut sets' may be useful in the population of individual cells in the lookup table.

In various embodiments, expertise data may be compiled by polling experts in the relevant fields for opinion data on likelihood of LRU failures. For example, experts may be presented with a failure mode such as unrequested braking with low hydraulic pressure at measurement point A (of FIG. 1). The expert may then respond by identifying LRU failures that may cause the identified failure mode. The expert may further provide an opinion whether the particular LRU failure is extremely likely, highly likely, likely, unlikely, highly unlikely, extremely unlikely, and/or unrelated. Data may be qualitative or quantitative, such as a number representing a probability. The English language responses may be normalized at converted into a failure likelihood percentage (or any form easily viewable by human observers). Where the strength of domain knowledge is less than desired or completely lacking, RMS data alone may be used to populate the lookup table. The RMS data populated lookup table may also be presented to experts to validate or contradict the presented lookup data.

TABLE T1

Exemplary lookup table for LRU failure probabilities based on failure mode.

| Failure Mode | LRU 1 | LRU 2 | LRU 3 | LRU 4 | LRU 5 | LRU 6 | LRU 7 | LRU 8 | LRU N |
|---|---|---|---|---|---|---|---|---|---|
| A1 | 75 | 0 | 25 | 0 | 0 | 0 | 0 | 0 | % N1 |
| A2 | 12 | 13 | 75 | 0 | 0 | 0 | 0 | 0 | % N2 |
| A3 | 0 | 0 | 0 | 0 | 0 | 0 | 90 | 10 | % N3 |
| AB1 | 100 | 0 | 0 | 0 | 0 | 0 | 0 | 0 | % N4 |

TABLE T1-continued

Exemplary lookup table for LRU failure probabilities based on failure mode.

| Failure Mode | LRU 1 | LRU 2 | LRU 3 | LRU 4 | LRU 5 | LRU 6 | LRU 7 | LRU 8 | LRU N |
|---|---|---|---|---|---|---|---|---|---|
| B1 | 5 | 0 | 0 | 0 | 0 | 0 | 0 | 95 | % N5 |
| B2 | 30 | 0 | 0 | 0 | 30 | 0 | 0 | 40 | % N6 |
| C1 | 0 | 0 | 0 | 0 | 0 | 0 | 0 | 100 | % N7 |
| D1 | 0 | 0 | 0 | 0 | 0 | 50 | 0 | 50 | % N8 |
| DE1 | 0 | 0 | 0 | 75 | 0 | 0 | 25 | 0 | % N9 |
| DE2 | 0 | 50 | 0 | 50 | 0 | 0 | 0 | 0 | % N10 |
| E1 | 0 | 0 | 0 | 100 | 0 | 0 | 0 | 0 | % N11 |
| Failure X | %1X | %2X | %3X | %4X | %5X | %6X | %7X | %8X | % NX |

Lookup table T1 (also referred to as a failure matrix) may comprise a plurality of rows and columns indexed by "Failure Mode." Each row may correspond to a failure mode. Each column may correspond to a specific, individual LRU located on an aircraft. For each failure mode, a row may contain the likelihood that each LRU on the aircraft caused the failure mode. Any non-zero entry in a row corresponding to a failure mode indicates that the LRU having the non-zero entry may have caused the failure mode. Any zero entry in a row may indicate that the LRU having the zero entry cannot cause the failure mode corresponding to the row. In that regard, each row may represent a vector of possible LRU failures causing the failure mode for the particular row. Rows in the lookup table may have a one-to-one relationship with detectable failure modes on an aircraft. Columns in the lookup table may have a one-to-one relationship with LRUs on an aircraft. Rows and columns of the lookup table may be switched.

In various embodiments, and with continuing reference to FIG. 2, the system may identify failure modes (Step 208). Based on the failure mode and expected operating conditions, a limited set of LRUs may have caused the failure mode. With brief reference to FIG. 1, identification of failure modes may include controller 101 receiving a measurement from sensor A indicative of one or more LRU failures. The detected failure mode may be a reading at sensor A occurring with unexpected braking, coded into the table as A3. The system may then select failure mode data (e.g., rows) corresponding to the failure mode from the lookup table using the failure mode as a key (Step 210). Each detectable failure mode may have a corresponding row in the lookup table, and each row in the lookup table may have a corresponding detectable failure mode. Continuing the above example, the system may select all rows corresponding to detected failure mode A3 from lookup table T1.

In various embodiments, the system may load the failure matrix (i.e., the selected rows from the lookup table) with appropriate probabilities for LRU failures (Step 212). Continuing the above example, the selected row corresponding to A3 indicates that LRU 7 has a 90% failure probability and LRU 8 has a 10% failure probability. The system may then derive the marginal distribution for each LRU failure (Step 214). In response to more than one row being selected from the lookup table, the system may consider the selected rows by summing the probabilities for a given LRU failure, multiplying the probabilities for a given LRU failure, or performing any suitable combination of mathematical operation to normalize LRU failure probability. The normalized LRU failure probability may be indicate the relative likelihood that each LRU has failed.

In various embodiments, the system may then rank the possible LRU failures based on the probability of failure (Step 216). The likelihood of LRU failures may then be provided (Step 220). A selected number of likely LRU failures may be provided as isolated results most likely to cause the detected failure. For example, the system may display the top three most likely LRU failures. The system may also display any LRU failure with likelihood greater than 10%.

Figure 3:
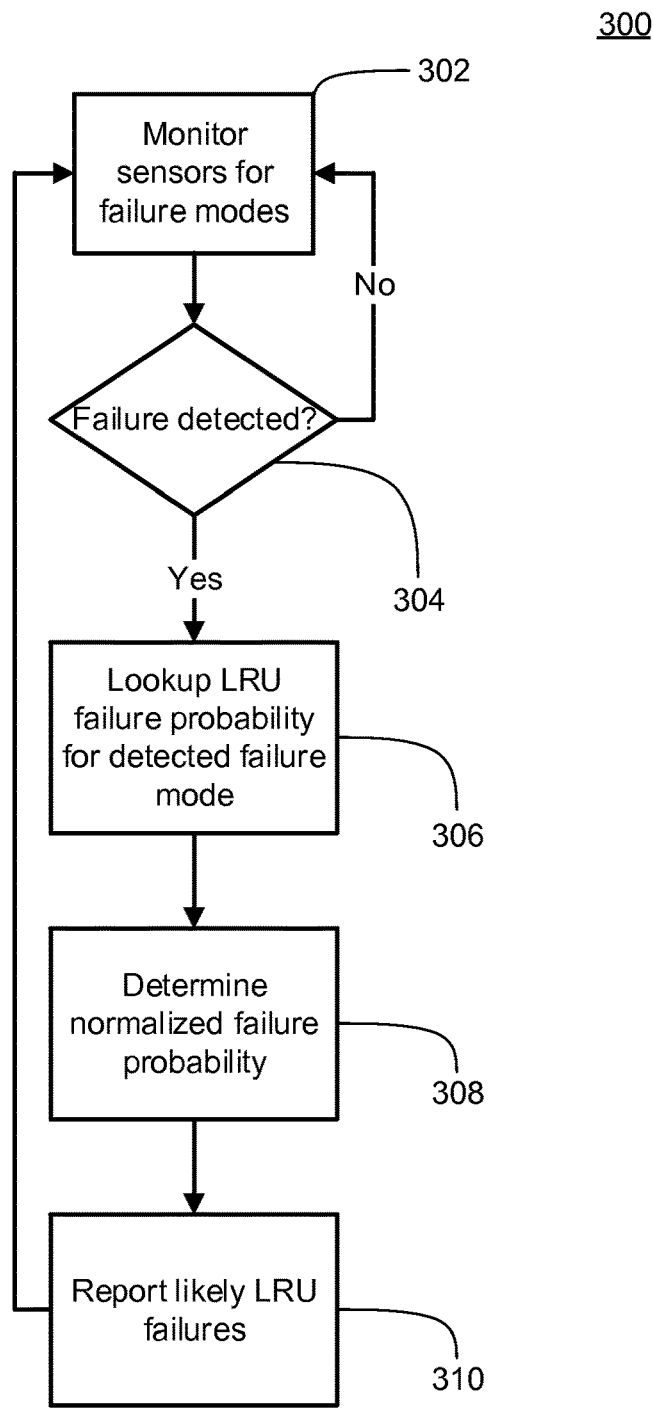
FIG. 3 illustrates a logical flow chart for diagnosing LRU failure or wear based on a detected failure mode, in accordance with various embodiments.

With reference to FIGS. 1 and 3, a logical flow chart 300 is shown for system 100 executing process 200 (of FIG. 2), in accordance with various embodiments. Controller 101 may monitor sensors (e.g., sensors A through E in FIG. 1) for failure modes (Step 302). If a failure is not detected, controller 100 may continue to monitor for failure modes (Step 304). In response to a failure being detected, controller 101 may lookup LRU failure probabilities for the detected failure mode (Step 306). The controller 101 may then determine normalized failure probabilities (Step 308) and report likely LRU failures (Step 310). Controller 101 may report failures by transmitting a signal, illuminating an indicator in the cockpit of an aircraft, displaying the failure on a maintenance terminal, recording the failure for reporting at a later time, or any other suitable method of communicating the failure. Controller 101 may also continue to monitor for additional failure modes after a failure mode is detected.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of identifying failures of line replaceable units (LRUs) in a brake system of an aircraft, comprising:
    measuring a hydraulic pressure level within the brake system using one or more sensors positioned at a measuring point within a hydraulic portion of the brake system;
    comparing the hydraulic pressure level to an expected pressure level at the measuring point to detect one or more failure modes in the brake system;
    selecting failure mode data corresponding to the one or more failure modes from a lookup table, wherein the failure mode data comprises a plurality of probabilities for failures of a selected set of the LRUs in the brake system and wherein the plurality of probabilities comprise at least one of reliability, safety and management data and expertise data;
    deriving a marginal distribution for each one of the selected set of LRUs, wherein the marginal distribution is derived by summing the probabilities corresponding to each one of the selected set of LRUs; and
    illuminating an indicator located within the aircraft to report an LRU failure probability for the detected one or more failure modes,
        wherein the brake system includes a brake control unit (BCU) connecting the one or more sensors and the indicator and wherein the lookup table is stored within a tangible, non-transitory memory within the BCU.

2. The method of claim 1, wherein the one or more sensors includes a pressure sensor configured to monitor pressure at a discrete location of a hydraulic brake system.

3. The method of claim 1, wherein the lookup table comprises at least one of a column or a row for each LRU from a plurality of LRUs.

* * * * *